US007813627B2

(12) United States Patent
Sarigiannidis et al.

(10) Patent No.: US 7,813,627 B2
(45) Date of Patent: Oct. 12, 2010

(54) LOW VAPOR PRESSURE HIGH PURITY GAS DELIVERY SYSTEM

(75) Inventors: Christos Sarigiannidis, Williamsville, NY (US); Thomas John Bergman, Jr., Clarence Center, NY (US); Michael Clinton Johnson, Grand Island, NY (US); Shrikar Chakravarti, East Amherst, NY (US)

(73) Assignee: Praxair Technology, Inc., Danbury, CT (US)

(*) Notice: Subject to any disclaimer, the term of this patent is extended or adjusted under 35 U.S.C. 154(b) by 967 days.

(21) Appl. No.: 11/540,220

(22) Filed: Sep. 29, 2006

(65) Prior Publication Data

US 2008/0078447 A1 Apr. 3, 2008

(51) Int. Cl.
*F22B 1/28* (2006.01)
*H05B 3/02* (2006.01)
*B01D 50/00* (2006.01)

(52) U.S. Cl. .......................... 392/400; 219/486; 55/319

(58) Field of Classification Search ................. 392/400, 392/386–406, 449–464, 324–337; 219/486, 219/497; 159/22; 55/319
See application file for complete search history.

(56) References Cited

U.S. PATENT DOCUMENTS 4,057,396 A * 11/1977 Matovich .................... 422/202
4,410,030 A * 10/1983 Skala ......................... 165/236
6,023,933 A 2/2000 Langan et al.
6,025,576 A 2/2000 Beck et al.
6,199,384 B1 3/2001 Udischas et al.
6,327,872 B1 12/2001 Boyd et al.
6,363,728 B1 4/2002 Udischas et al.
6,581,412 B2 6/2003 Pant et al.
6,614,009 B2 9/2003 Gershtein et al.
6,614,412 B1 9/2003 Hirano et al.
6,652,818 B1 * 11/2003 Mills et al. .................. 422/295
7,347,054 B2 3/2008 Rameau et al.
2004/0175160 A1 * 9/2004 Groom ....................... 392/397
2006/0231144 A1 10/2006 Schwan et al.
2008/0000239 A1 1/2008 Timm et al.
2008/0010956 A1 * 1/2008 Fogelman et al. ............. 55/319

FOREIGN PATENT DOCUMENTS

WO WO 2006/010828 A1 2/2006
WO WO 2007/072470 A1 6/2007

* cited by examiner

*Primary Examiner*—Daniel Robinson
(74) *Attorney, Agent, or Firm*—Iurie A. Schwartz

(57) ABSTRACT

Systems, apparatuses and methods for vapor phase fluid delivery to a desired end use are provided, wherein the conditions of the system are monitored to determine when the water concentration or supply vessel surface temperature exceeds a specified value or when the low vapor pressure fluid pressure falls below a specified value for the purpose of removing a first supply vessel from service by discontinuing vapor flow from the first supply vessel and initiating vapor flow from a second supply vessel.

14 Claims, 4 Drawing Sheets

LOW VAPOR PRESSURE HIGH PURITY GAS DELIVERY SYSTEM

FIELD OF THE INVENTION

The present invention relates generally to the efficient delivery of low vapor pressure high purity gases from delivery vessels. More particularly, the present invention relates to methods and apparatuses for the efficient delivery of low vapor pressure high purity gases from a plurality of heated supply vessels.

BACKGROUND OF THE INVENTION

Non-air gases (i.e. gases that are not derived from air) are commonly used in the manufacture of products such as semiconductors, LCDs, LEDs and solar cells. For example, nitrogen trifluoride is used as a chamber cleaning gas, while silane and ammonia can be used for deposition of silicon and silicon nitride respectively during chemical vapor deposition (CVD) processes.

Semiconductor, LCD, LED and solar cell manufacturers often require a supply of non-air gas in the vapor phase, at high or ultra-high purity at a high flow rate with the capability of supplying the gas in the vapor phase in a discontinuous flow pattern. The presence of low-volatility contaminants in these gases (i.e. contaminants that are less volatile than the non-air gas) is particularly undesirable, since they can deposit on the product substrate and deteriorate, or otherwise adversely affect product performance. For example, water, is a common low volatility ammonia contaminant that can deposit on LED sapphire substrates, resulting in reduced LED brightness and yield loss. For such applications, vapor phase moisture levels in ammonia that exceed 1 ppb can be detrimental to the processes, and the products produced thereby.

New semiconductor products have large throughput and consequently require large quantities of non-air gases. Additionally, due to the batch nature of semiconductor process tool operation, the use pattern of non-air gases is often preferably discontinuous.

Many non-air gases are transported and stored as liquids or vapor/liquid mixtures. Such gases are known as low vapor pressure gases and include, for example, ammonia, hydrogen chloride, carbon dioxide and dichlorosilane. Low vapor pressure gases typically have a vapor pressure less than about 1500 psig at a temperature of about 70° F. According to known methods, because low vapor pressure gases are supplied as liquids or vapor/liquid mixtures, a device for heating/boiling these gases is required so that vapor phase product can be supplied to the desired end use, such as, for example, the semiconductor, LED, LCD or solar cell manufacturing process. This boiling is commonly achieved by applying heat to the supply vessel outer wall, as described, for example, in U.S. Pat. Nos. 6,025,576 or 6,614,412. In such systems, vapor phase low vapor pressure gas is withdrawn from the supply vessel. Sufficient heat is applied to boil liquid phase low vapor pressure gas at the rate that vapor phase low vapor pressure gas is withdrawn from the supply vessel, thereby theoretically maintaining supply vessel pressure.

U.S. Pat. No. 6,025,576 describes a configuration whereby vapor phase, low vapor pressure gas is withdrawn from a heated transport vessel that uses heaters that are only in tensioned, non-permanent contact with transport vessel. The contaminants that have a lower volatility than the low vapor pressure gas preferentially remain in the liquid, producing low contaminant level vapor. Vapor is drawn from the vessel until liquefied gas occupies only about 10% volume of the cylinder, which brings the contact area of the liquefied gas to below the heater level.

U.S. Pat. No. 6,614,009 discloses a system configuration whereby vapor phase, low vapor pressure gas is withdrawn from a large heated transport vessel (e.g. isotainer) that includes permanently positioned heaters. These heaters are preferably located so as to minimize direct heating above the lowest expected liquid level to maximize purity. However, the '009 patent does not describe a means to maximize low vapor pressure gas utilization by maintaining a supply vessel in service until the moisture level exceeds some value.

U.S. Pat. No. 6,581,412 describes a system whereby vapor phase, low vapor pressure gas is withdrawn from a heated transport vessel that employs heaters which are in contact with the transport vessel. This patent describes a method for controlling the temperature of a liquefied compressed gas in a supply vessel comprising: positioning a temperature measuring means onto the wall of the compressed gas supply vessel, monitoring the temperature of the supply vessel and controlling heater means to heat the liquefied gas in the supply vessel. However, the '412 patent does not describe a means to identify the appropriate time to remove a supply vessel from service.

U.S. Pat. No. 6,363,728 describes a means for controlling heat input to a low vapor pressure gas contained in a heated transport vessel. The system comprises a heat exchanger disposed on a delivery vessel to provide or remove energy from a liquefied gas, pressure controller for monitoring pressure and a means for adjusting the energy delivered to the vessel contents. However, the '728 patent does not describe a means to identify the appropriate time to remove a supply vessel from service.

A typical, known means of addressing present operational challenges in the industry is to remove the supply vessel from service when the mass of low vapor pressure gas remaining in the supply vessel falls to a pre-set value (typically from about 10% to about 20% of the initial mass). However, this approach fails to recognize that the key liquid level (that is, the liquid level at which a vessel should be removed from service) will be different depending on the key parameter that is selected (vessel pressure, wall temperature or water level).

A significant problem exists in the field, as no useful means exists for determining efficiently when a low vapor pressure gas supply vessel should be removed from service. Presently known systems risk removing a supply vessel from service too early or too late. As a result, if the supply vessel is removed from service too early, low vapor pressure gas will be wasted. If the supply vessel is removed from service too late, several deleterious effects can occur. For example, the contaminant level can build beyond tolerable limits, resulting in adverse effects in the end use, such as, for example, semiconductor, LED, LCD or solar cell manufacturing processes. Such potential adverse effects include, for example, yield loss.

SUMMARY OF THE INVENTION

According to one embodiment, the present invention is directed to a method and apparatus for vapor phase fluid delivery to a desired end use, wherein the conditions of the system are monitored to determine when the water concentration or supply vessel surface temperature exceeds a specified value or when the low vapor pressure fluid pressure falls below a specified value for the purpose of removing a first supply vessel from service by discontinuing vapor flow from the first supply vessel and initiating vapor flow from a second supply vessel. Preferably, the liquid level at which this occurs is located near the plane determined by the upper edges of the heaters.

In a further embodiment, the present invention is directed to a method for delivering vapor phase fluid under pressure from a vessel by providing at least a first and second vessel, each vessel having a vessel wall, providing an amount of vapor phase fluid from the first or second vessel and providing at least one heater in communication with the first vessel wall and at least one heater in communication with the second vessel wall. Each vessel is heated before being brought on line to achieve a predetermined pressure within the first and second vessel as needed. At least one heat controller is provided in communication with the heaters for controlling the amount of heat delivered to the first and second vessel walls and the liquid phase fluid contained within the first and second vessels. A device to monitor a condition selected from the group consisting of vapor phase fluid pressure, vessel wall temperature and vapor phase fluid water concentration in the first and second vessels is provided for monitoring the condition selected from the group consisting of vapor phase fluid pressure, vessel wall temperature and vapor phase fluid water concentration in the first and second vessels to determine the key fluid level in the first and second vessel. A second controller is provided in communication with the device and at least one valve having an on/off position. The valve directs flow from the vessel to an end use, with the second controller activating the valve on/off position and activating the valve to an off position when the key fluid level reaches a predetermined level in a vessel, and opens a valve to direct vapor phase fluid from a second vessel to the end use.

In a still further embodiment, the present invention is directed to an apparatus and system for efficiently delivering a vapor phase fluid to an end use. The apparatus comprises at least a first and second vessel, each vessel having a vessel wall, and each vessel containing an amount of vapor phase fluid. A heater is placed in communication with the first and second vessel. A heat controller is in communication with the heater, with the heater controller controlling the amount of heat delivered to the first and second vessel and the liquid phase fluid contained within the first and second vessels. A device to monitor a condition selected from the group consisting of vapor phase fluid pressure, vessel wall temperature and vapor phase fluid water concentration in the first and second vessels is placed in communication with the vapor phase fluid. A second controller is placed in communication with the device and with a valve having an on/off position. The valve directs flow from the vessel to an end use, with the second controller activating the valve on/off position to an off position when the key fluid level reaches a predetermined level, and opens a valve to direct vapor phase fluid from a second vessel to the end use.

DETAILED DESCRIPTION OF THE DRAWINGS

Other objects, features, embodiments and advantages will occur to those skilled in the art from the following description of preferred embodiments and the accompanying drawings, in which:

FIGS. 1*a* and 1*b* are cross-sectional diagrams of conventional supply vessel systems with heating features positioned adjacent to the outer vessel wall.

DETAILED DESCRIPTION OF THE INVENTION

Known techniques in the field of low vapor pressure high purity gas delivery systems fail to recognize that the key liquid level will vary depending on whether pressure degradation, vessel wall temperature increase or water level increase is most important. In the example cited in U.S. Pat. No. 6,025,576, allowing the liquid level to fall below the heater would cause the pressure to degrade and the water level to increase before the vessel is removed from service. The '576 patent also fails to recognize that the key liquid level will vary depending on equipment and operational parameters, such as heater configuration and vapor draw rate.

Co-pending and commonly assigned U.S. patent application Ser. No. 11/476,042, filed Jun. 28, 2006 describes, according to certain embodiments, a means for attaching heaters to the lower portion of a supply vessel containing low vapor pressure gas. This application states that known low vapor pressure gas supply systems can produce "hot spots" and vigorous low vapor pressure gas boiling, which can result in the delivery of contaminants to the customer. This application further describes the accumulation of moisture due to simple vapor/liquid equilibrium, and that, because of this equilibrium based moisture accumulation, a percentage of the low vapor pressure gas must be discarded (typically 10%-20%). The contents of this co-pending and commonly-assigned U.S. patent application are incorporated by reference in its entirety herein, as if made a part of the present application.

As a result, in known systems, the supply vessel is likely to be removed from service too early (i.e. prior to the on set of the challenges listed above) or too late (after the supply vessel wall temperature, water level or have exceeded acceptable limits). If the supply vessel is removed from service too early, some of the low vapor pressure gas that could be utilized will be wasted. If the supply vessel is removed from service too late, one of the key parameters could exceed acceptable limits. For example, the water level could become too high, which would have an adverse effect on the semiconductor, LED, LCD or solar cell manufacturer process, resulting in poor product quality or product loss. Allowing the water level to exceed acceptable limits could also increase the cost of ammonia purification downstream of the supply vessel at those sites where ammonia purification systems are utilized.

According to one embodiment of the present invention, the systems and apparatuses of the present invention recognize and use these variations to maximize low vapor pressure product utilization without negatively impacting the semiconductor, LCD, LED or solar cell manufacturing process.

Figure 1:
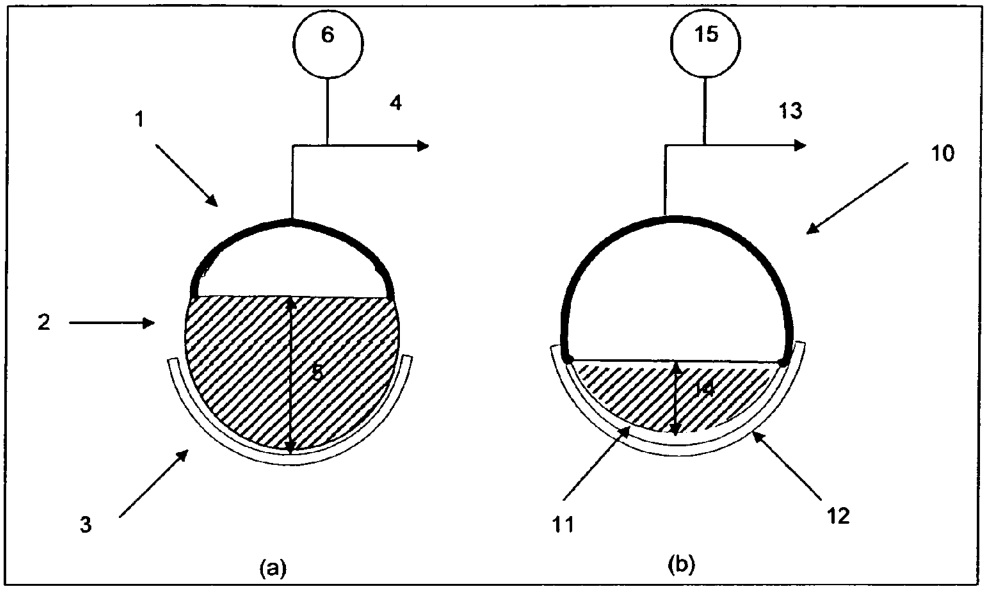

It is difficult for conventional low vapor pressure gas supply systems to consistently meet semiconductor, LED, LCD and solar cell manufacturer requirements. For example, heat transfer becomes ineffective when a significant portion of the heat is applied to that portion of the supply vessel wall that is not in contact with liquid phase low vapor pressure gas. Experiments were conducted to determine the ability to transfer heat to liquid phase ammonia as the liquid level falls, causing the portion of the supply vessel wall that is in contact with liquid phase ammonia to decrease. While ammonia was selected for illustrative purposes, the methods and apparatuses of the present invention also lend significant advantage to the processing of gases including, but not limited to boron trichloride, carbon dioxide, chlorine, dichlorosilane, halocarbons, hydrogen bromide, hydrogen chloride, hydrogen fluoride, methylsilane, nitrous oxide, nitrogen trifluoride, trichlorosilane, and mixtures thereof. As depicted in FIG. 1, vapor phase ammonia was withdrawn from a supply vessel at a constant rate via conduits 4 and 13. To replenish the withdrawn vapor and maintain supply vessel pressure, heat was applied to the outside, bottom surface of the supply vessel using surface mounted heaters 3 and 12. The ability to transfer heat to the liquid phase ammonia was determined by monitoring the vessel pressure using pressure measuring devices 6 and 15. If heat transfer is ineffective, the supply vessel pressure will fall.

Figure 2:
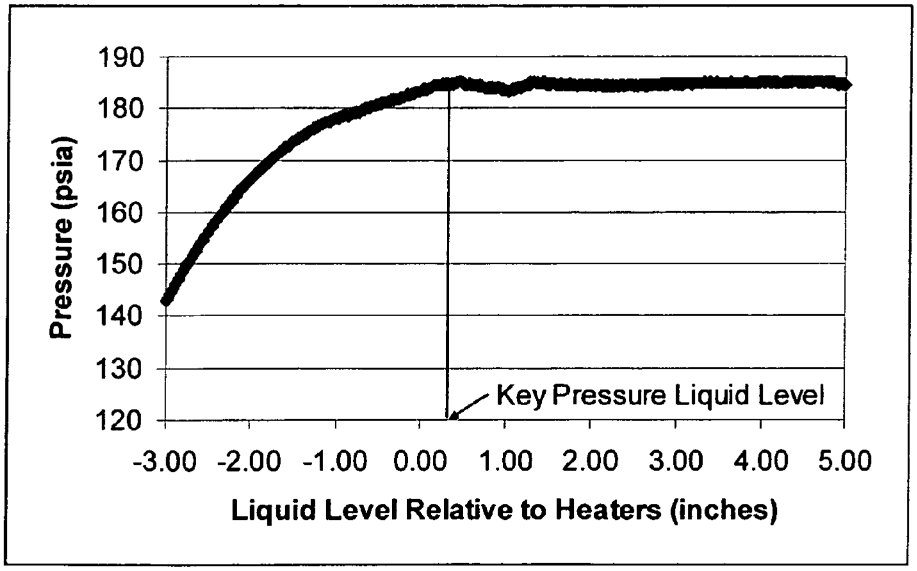
FIG. 2 is a graph charting vapor pressure as a function of liquid level in the vessel relative to heating units.

FIG. 2 shows the pressure measured as a function of liquid level (x-axis positive values indicate that the liquid level is above the heater and vice versa). Note that when the liquid level is above the heater, the supply vessel pressure is generally sustained (heat transfer is effective). When the liquid level approaches the heater, the supply vessel pressure is not sustained (heat transfer is ineffective). Therefore, at some liquid level referred to as "key pressure liquid level", the supply vessel pressure will no longer be sustainable. This key pressure liquid level will vary from system to system and will depend on a number of variables, such as vapor draw rate, heater configuration, heater temperature and contact intimacy between the heater and supply vessel wall. The key pressure liquid level is likely to be lower than the point at which the liquid level is equal to the heater level, although as shown in FIG. 2, it may also be located above the heater level.

The key liquid level will also vary from system to system based on, for example, vapor draw rate, heater configuration, heater temperature and contact intimacy between the heater and supply vessel wall. For example, at low vapor draw rates, the key pressure liquid level will be lower than at high vapor draw rates, since the heater area required to maintain supply vessel pressure is lower at low vapor draw rates.

Figure 3:
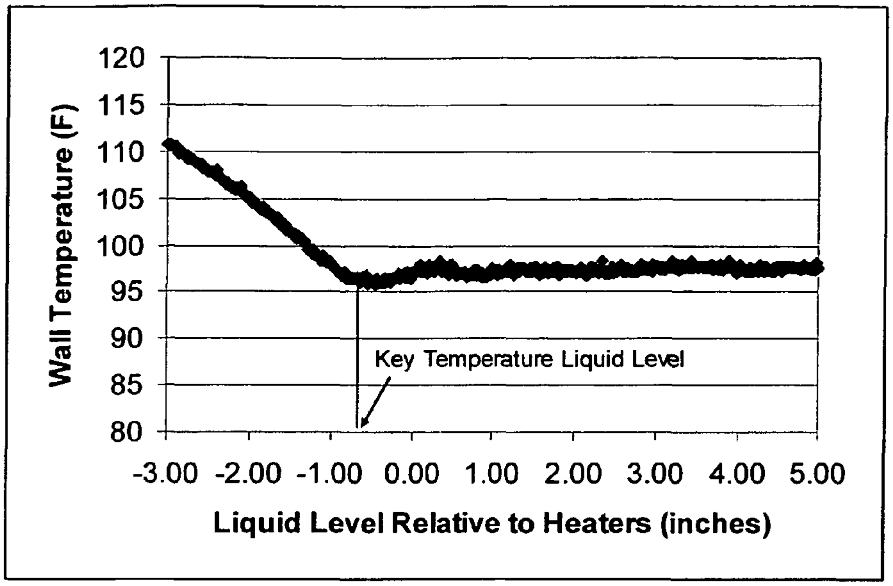
FIG. 3 is a graph charting vessel wall temperature as a function of liquid level relative to heating units.

The supply vessel wall temperature may increase beyond design limits locally when a significant portion of the heat is applied to that portion of the supply vessel wall that is not in contact with liquid phase low vapor pressure gas. Experiments were conducted to determine the effect of liquid level on supply vessel wall temperature. The results are shown in FIG. 3 (x-axis positive values indicate that the liquid level is above heater and vice versa). It was determined that when the liquid level drops below the key temperature liquid level, the supply vessel wall temperature begins to increase in that portion of the supply vessel wall that is not in contact with liquid phase low vapor pressure gas. Supply vessels are designed to operate near ambient temperature and typically have a very low maximum acceptable operating temperature. A typical maximum acceptable operating temperature is about 125° F. Operating at temperatures in excess of the maximum acceptable operating temperature is a safety issue and could result in vessel failure. As shown in FIG. 3, this temperature limitation is approached as the liquid level falls below the key temperature liquid level. The key temperature liquid level (−0.7 inches, liquid level below the heater) is different than the key pressure liquid level (0.35 inches, liquid level above the heater).

The low-volatility contaminant level in the vapor phase substantially exceeds equilibrium levels when a significant portion of the heat is applied to that portion of the supply vessel wall that is not in contact with liquid phase low vapor pressure gas. Because they do not evaporate readily, low-volatility contaminants preferentially remain in the liquid phase as vapor phase low vapor pressure gas is withdrawn from the supply vessel. As a result, as explained above, the low-volatility contaminant concentration in both the vapor and liquid phases increases with time.

Figure 4:
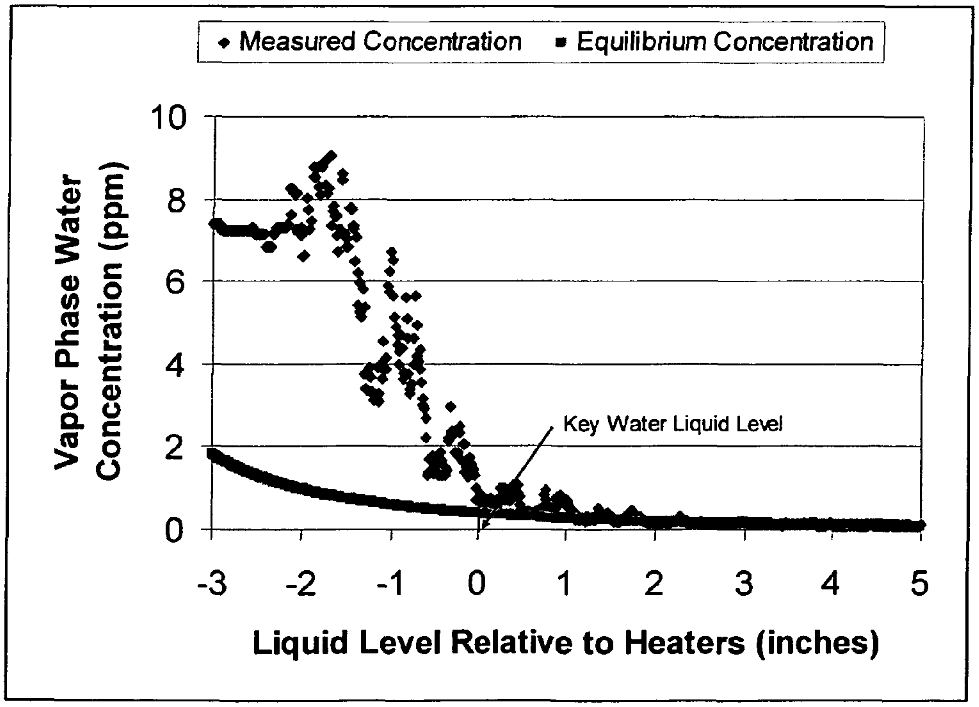
FIG. 4 is a graph charting vapor phase water concentration as a function of liquid level relative to heaters.

The low-volatility contaminant level resulting from this phenomenon is referred to as the equilibrium contaminant level. Experiments were conducted to determine the low-volatility contaminant level observed in vapor ammonia drawn from the supply vessel as liquid level falls, causing the portion of the supply vessel that is in contact with liquid phase ammonia to decrease. In these experiments, the low-volatility contaminant was water. The results are shown in FIG. 4. Note that the water concentration observed as the liquid level decreases reflects the projected equilibrium concentration until the key water liquid level is reached. At that key water liquid level, the water concentration substantially exceeds predicted equilibrium values. For these experiments, the key water liquid level occurs when the liquid level falls about to a level substantially equivalent to the heater level.

As stated above, previously known systems fail to recognize that the key liquid level will vary depending on whether pressure degradation, vessel wall temperature increase or water level increase is most important. Allowing the liquid level to fall below the heater would cause the pressure to degrade and the water level to increase before the vessel is removed from service. Previous systems also fail to recognize that the key liquid level will vary depending on equipment and operational parameters, such as heater configuration and vapor draw rate. According to one preferred embodiment, the present invention recognizes and uses these variations to maximize low vapor pressure product utilization without negatively impacting the semiconductor, LCD, LED or solar cell manufacturing process.

Further, presently known methods and systems do not describe a means to maximize low vapor pressure gas utilization by maintaining a supply vessel in service until the moisture level, wall temperature or pressure exceed some value, and further fail to provide a means to identify the appropriate time to remove a supply vessel from service.

When the water concentration or supply vessel surface temperature exceeds a specified value or when the low vapor pressure fluid pressure falls below a specified value, the supply vessel is removed from service by discontinuing vapor flow from the first supply vessel and initiating vapor flow from a second supply vessel. The liquid level at which this occurs is located near the plane determined by the upper edges of the heaters.

According to one embodiment, the present invention provides a means to maximize low vapor pressure gas utilization without supply vessel pressure degradation, supply vessel overheating or high water level product delivery to the semiconductor, LCD, LED or solar cell manufacturer. Supply vessel overheating is an issue with respect to safe operation. Pressure degradation and high moisture level are an issue with respect to semiconductor, LCD, LED or solar cell yield.

Figure 5:
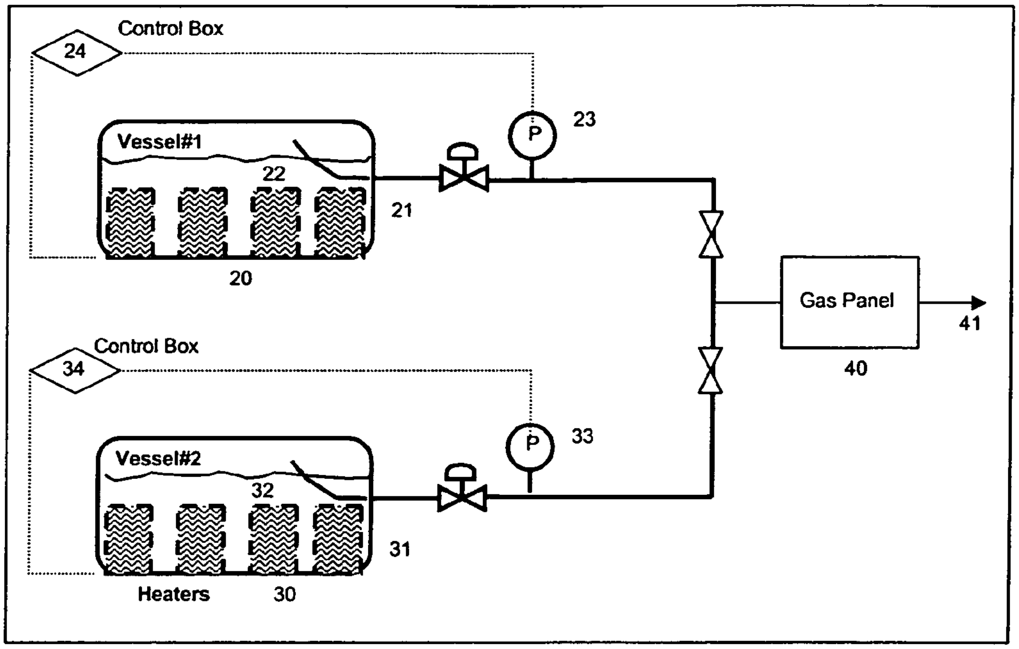
FIG. 5 is a schematic diagram of a conventional low vapor pressure fluid supply system.

FIG. 5 depicts a conventional low vapor pressure fluid supply configuration. In general, the system intent is to deliver liquid or two-phase low vapor pressure fluid contained in a supply vessel to a semiconductor, LED, LCD or solar cell manufacturing facility and to convert it into vapor phase low vapor pressure fluid. Supply vessels 20 and 30 containing, for example, vapor and liquid phase ammonia are installed in parallel so that as one vessel is consumed, the other can be brought into service without disrupting supply to the semiconductor, LED, LCD or solar cell manufacturer. Vapor phase ammonia is withdrawn from whichever vessel is in service via conduit 21 or 31. It is then transferred to a gas panel 40, which regulates the ammonia pressure and temperature prior to delivery to a semiconductor, LED, LCD or solar cell manufacturing facility via conduit 41.

As vapor phase ammonia is withdrawn from supply vessel 20 or 30, the supply vessel pressure is maintained using one or more heater systems 22 and 32 and a closed loop heater control means. Typically, a pressure transducer 23 or 33 monitors the supply vessel pressure and sends a signal to a programmable logic controller 24 or 34, where the signal is compared to a set point value. Based on the difference between these values, the energy delivered to supply vessel 20 or 30 from heater system 22 or 32 is adjusted. This facilitates vaporization of ammonia to sustain the required supply vessel pressure.

Although a number of heater types may be employed, a common heater type is a silicone rubber blanket heater. This silicone rubber blanket heater may be affixed to the vessel in a variety of ways. A typical silicon rubber heater is that available from Watlow Electric Manufacturing Company (St. Louis, Mo.). The heater preferably is installed so that its heat is evenly distributed to the bottom of the vessel and such that it does not rise to too high a level on the vessel. According to one embodiment of the present invention, a method for discontinuing flow from the vessel is used. If the heater rises to too high a level on the vessel, a significant portion of the ammonia will be wasted. The heater typically covers from about 5% to about 50% of the vessel circumference, preferably from about 10% to about 40% of the vessel circumference and most preferably from about 20% to about 35% of the vessel circumference. The silicone rubber heater typically operates at a temperature ranging from about 100 to about 500° F., preferably from about 120 to about 300° F. and most preferably from about 130 to about 200° F. Such a heating configuration is preferably used with a number of supply vessel types. For example, a horizontally mounted Y-cylinder, which initially contains approximately 500 lbs of ammonia, could be used.

Ammonia is withdrawn from supply vessel 20 or 30 until the mass remaining drops to from about 10% to about 30% of the original level. When this level is reached, the supply vessel is removed from service and the remaining liquid, which is referred to as the heel, is discarded. The heel is enriched in contaminants that have a lower vapor pressure than ammonia, such as water.

Figure 6:
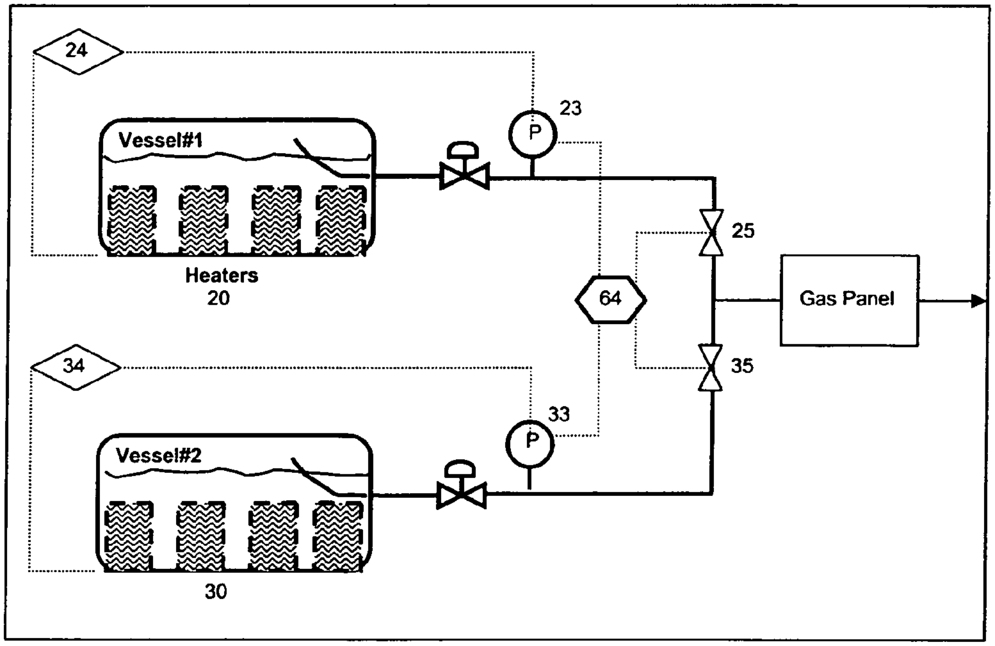
FIGS. 6-8 are schematic diagrams of preferred embodiments of the low vapor pressure fluid supply systems of the present invention.
Figure 7:
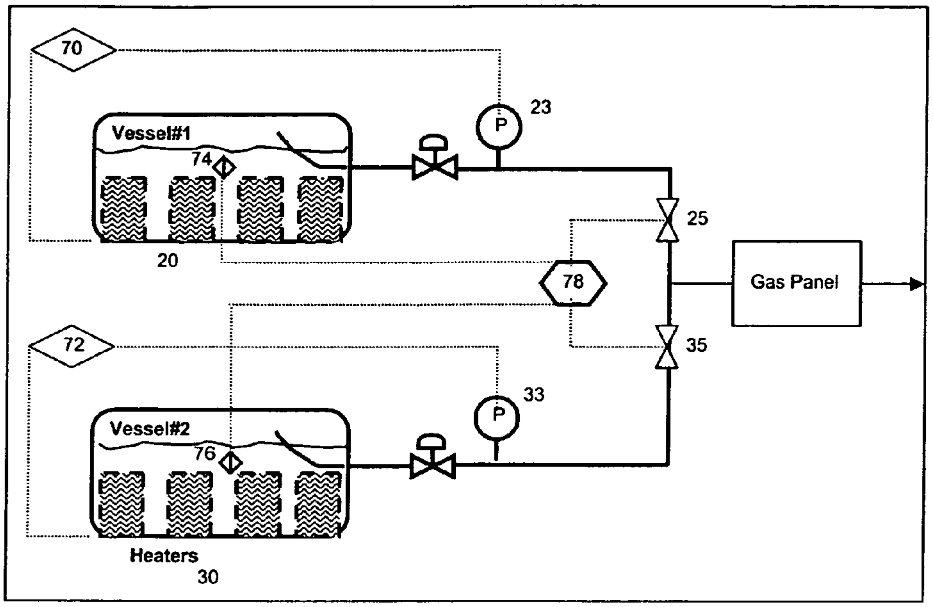
Figure 8:
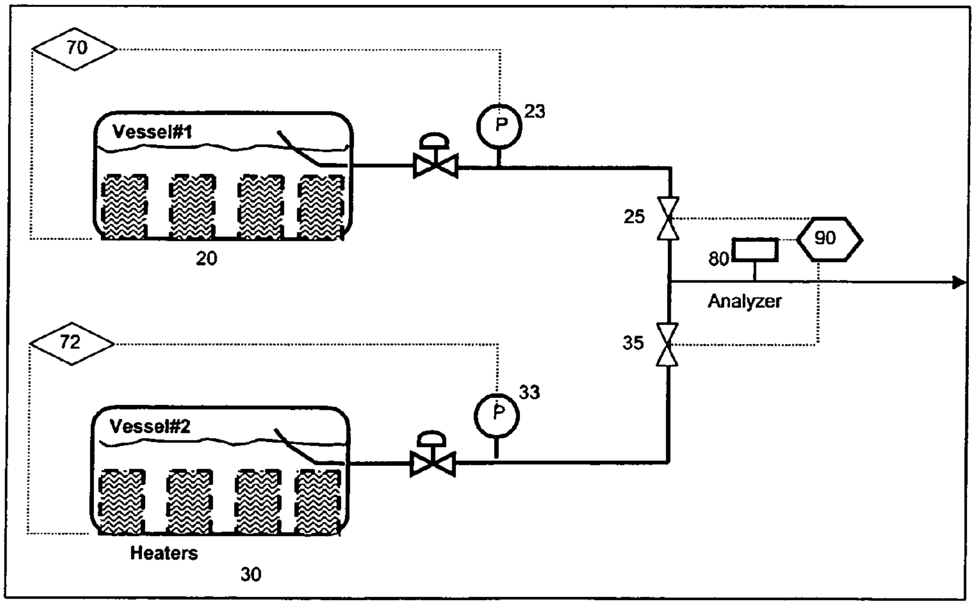

Preferred embodiments of the present invention are depicted in FIGS. 6, 7 and 8. As described previously, according to embodiments of the present invention, the present systems and apparatuses determine the point at which a supply vessel 20 or 30 should be removed from service. More specifically, FIG. 6 depicts a means for determining the point at which the supply vessel 20 or 30 should be removed from service based on pressure. The pressure at the outlet of each supply vessel 20 and 30 is monitored using pressure transducer 23 and 33, respectively. This pressure is maintained, typically within the range of from about 50 to about 250 psig, preferably within the range of from about 100 to about 200 psig and most preferably in the range of from about 120 to about 180 psig. When the liquid content of supply vessel 20 or 30 drops to a level at which the desired pressure cannot be sustained and falls below some predetermined value, a controller 64 will cause vapor flow from the supply vessel that is in use to cease by closing either valve 25 or valve 35, depending on which supply vessel is in service. The switch-over pressure typically occurs when the pressure decreases by an amount of from about 1 to about 100 psi, preferably when the pressure decreases by an amount of from about 5 to about 50 psi and more preferably when the pressure decreases by an amount of from about 5 to about 20 psi. Flow is then initiated from the supply vessel that was not in service by opening valve 25 or 35.

FIG. 7 depicts a further embodiment of the present invention whereby a means for determining the point at which the supply vessel 20 or 30 should be removed from service based on supply vessel wall temperature. The vessel wall temperature is monitored using temperature elements 74, 76 respectively. This temperature is typically within the range of from about 0° to about 125° F., preferably within the range of from about 30° to about 125° F. and most preferably within the range of from about 60° to about 125° F. When the liquid contents of the supply vessel drop to a level at which the surface temperature approaches the set point range, typically from about 70° to about 125° F., preferably within the range of from about 100° to about 125° F. and most preferably within the range of from about 115° to about 125° F., a controller 78 will cause vapor flow from the supply vessel that is in use to cease by closing either valve 25 or valve 35, depending on which supply vessel is in service. Flow is then initiated from the supply vessel that was not in service, by opening valve 25 or 35.

FIG. 8 depicts a means for determining the point at which the supply vessel 20 or 30 should be removed from service based on water concentration. The water concentration at the outlet of each supply vessel 20 and 30 is monitored using moisture analyzer 80. The water concentration is typically within the range of from about 0.001 to about 10 ppm, preferably within the range of from about 0.01 to about 5 ppm and most preferably within the range of from about 0.1 to about 2 ppm. When the liquid contents of the supply vessel 20 or 30 drops to a level at which the water concentration increases beyond the level predicted by vapor/liquid equilibrium, a controller 90 will cause vapor flow from the supply vessel that is in use to cease by closing either valve 25 or valve 35, depending on which supply vessel is in service. Flow is then initiated from the supply vessel that was not in service by opening valve 25 or 35.

The proposed control mechanisms can be applied to any size vessel, such as a T-cylinder, a Y-cylinder (ton container) or an ISO container, tube trailer or tanker that contains any desired liquid or two phase low vapor pressure gas, such as, for example, ammonia, thereby producing a vapor phase low vapor pressure gas stream. For example, ton containers are typically horizontally oriented and made from 4130X alloy steel and can contain, for example, 510 pounds of ammonia when filled to capacity. The vessels may be pre-filled and self-contained, or may be fillable from a source as would be readily understood by one skilled in the field of gas delivery systems.

A number of heater types may be used for delivering heat to the larger vessel. The most common are electrical resistance heaters, including blanket heaters, heating bars, cables and coils, band heaters, and heating wires. Heaters are preferably installed at the lower portion of the vessel and a heater controller preferably regulates the amount of heat delivered to the low vapor pressure gas maintaining the vapor output. Other potentially useful heater types include, for example, bath heaters, inductive heaters, heat exchangers that contain a heat transfer medium (such as, for example, silicone oil), etc.

Vapor low vapor pressure non-air gas leaving the second vessel may be further purified by, for example, adsorption, filtration or distillation means to further improve purity. It is further contemplated that the gas stream could be sent to a mist eliminator to remove any liquid phase low vapor pressure gas droplets that carry over from the supply vessel due to vigorous boiling. These droplets would be collected by a mist eliminator, and could be returned to the supply vessel by suitable delivery means, such as, for example, by gravity.

While the invention has been described in detail with reference to specific embodiments thereof, it will be apparent to one skilled in the field that various changes, modifications and substitutions can be made, and equivalents employed without departing from, and are intended to be included within, the scope of the claims.

What is claimed is:

1. A system for delivering vapor phase fluid comprising:

at least a first and second vessel, each vessel having a vessel wall, each vessel containing an amount of liquid phase fluid;

a heater in communication with each of the first and second vessel;

a controller in communication with the heater, said controller controlling an amount of heat delivered to the first and second vessels and an amount of heat delivered to the liquid phase fluid contained within the first and second vessels;

a sensor to monitor at least one condition, said condition selected from the group consisting of: vapor phase fluid pressure, vessel wall temperature, vapor phase fluid low vapor pressure contaminant concentration, and combinations thereof, in the first and second vessels; and a controller in communication with the sensor, and at least one valve having an on/off position, said valve directing flow from the first or second vessel to an end use, said sensor activating the valve on/off position to an off position when the condition reaches a predetermined level; and a vapor phase fluid delivery control loop in communication with the first and second vessels and an end use, such that, as flow from a first vessel is diminished, flow from a second level is increased.

2. The system of claim 1, wherein the vapor phase fluid is a non-air based gas selected from the group consisting of: ammonia, boron trichloride, carbon dioxide, chlorine, dichlorosilane, halocarbons, hydrogen bromide, hydrogen chloride, hydrogen fluoride, methylsilane, nitrous oxide, nitrogen trifluoride, trichlorosilane, and mixtures thereof.

3. The system of claim 1, wherein the low vapor pressure contaminant is water.

4. The system of claim 1, wherein the first and second vessel are made from a material selected from the group consisting of: 304 stainless steel, 316 stainless steel, Hasteloy, carbon steel and mixtures thereof.

5. The system of claim 1, wherein the first and second vessels are selected from the group consisting of: ISO container vessels, ton container vessels and drum container vessels.

6. The system of claim 1, wherein the heater is an electrical heater selected from the group consisting of: silicon blanket heaters, band heaters, heating bars, heating tape and combinations thereof.

7. The system of claim 1, wherein the end use is the manufacture of a device, said device selected from the group consisting of: a semiconductor, a liquid crystal display and a light emitting diode.

8. The system of claim 1, wherein the vapor phase fluid is selected from the group consisting of: high purity vapor phase fluid, ultra-high purity vapor phase fluid, and combinations thereof.

9. The system of claim 1, wherein the vessel wall temperature set point range is from 0° to 125° F.

10. The system of claim 1, wherein the vessel wall temperature set point range is from 30° to 125° F.

11. The system of claim 1, wherein the vessel wall temperature set point range is from 60° to 125° F.

12. The system of claim 1, wherein the heater covers from 5% to 50% of the first and second vessel's circumference, respectively.

13. The system of claim 1, wherein the heater covers from 10% to 40% of the first and second vessel's circumference, respectively.

14. The system of claim 1, wherein the heater covers from about 20% to 35% of the first and second vessel's circumference, respectively.

* * * * *